(12) United States Patent
Vetillard et al.

(10) Patent No.: US 7,827,534 B2
(45) Date of Patent: Nov. 2, 2010

(54) METHOD FOR DETERMINING OPERATIONAL CHARACTERISTICS OF A PROGRAM

(75) Inventors: Eric Vetillard, Valbonne (FR); Renaud Marlet, Paris (FR)

(73) Assignee: Trusted Logic, Versailles (FR)

( * ) Notice: Subject to any disclaimer, the term of this patent is extended or adjusted under 35 U.S.C. 154(b) by 793 days.

(21) Appl. No.: 10/585,101

(22) PCT Filed: Dec. 27, 2004

(86) PCT No.: PCT/FR2004/003394

§ 371 (c)(1),
(2), (4) Date: Jun. 30, 2006

(87) PCT Pub. No.: WO2005/073860

PCT Pub. Date: Aug. 11, 2005

(65) Prior Publication Data

US 2007/0168987 A1      Jul. 19, 2007

(30) Foreign Application Priority Data

Dec. 30, 2003    (FR)    .................. 03 15544

(51) Int. Cl.
*G06F 9/45*    (2006.01)
(52) U.S. Cl. .................. 717/126; 717/124; 717/127; 717/131
(58) Field of Classification Search .................. None
See application file for complete search history.

(56) References Cited

U.S. PATENT DOCUMENTS

| | | | |
|---|---|---|---|
| 5,963,739 A * | 10/1999 | Homeier | 717/126 |
| 6,213,391 B1 * | 4/2001 | Lewis | 235/380 |
| 6,418,444 B1 * | 7/2002 | Raduchel et al. | 707/103 Z |
| 6,684,194 B1 * | 1/2004 | Eldering et al. | 705/10 |
| 6,993,761 B1 * | 1/2006 | Czajkowski et al. | 718/100 |
| 7,000,151 B2 * | 2/2006 | Dwyer | 714/38 |
| 7,051,200 B1 * | 5/2006 | Manferdelli et al. | 713/153 |
| 7,120,572 B1 * | 10/2006 | Liang | 703/26 |
| 2001/0037438 A1 * | 11/2001 | Mathis | 711/163 |
| 2003/0154468 A1 * | 8/2003 | Gordon et al. | 717/143 |
| 2003/0233547 A1 * | 12/2003 | Gaston et al. | 713/168 |
| 2003/0237026 A1 * | 12/2003 | Petersen et al. | 714/38 |
| 2004/0003321 A1 * | 1/2004 | Glew et al. | 714/27 |
| 2004/0005051 A1 * | 1/2004 | Wheeler et al. | 380/28 |
| 2004/0031025 A1 * | 2/2004 | Brisset | 717/154 |
| 2005/0081061 A1 * | 4/2005 | Acott et al. | 713/201 |
| 2005/0273766 A1 * | 12/2005 | Vetrivelkumaran et al. | 717/131 |

* cited by examiner

*Primary Examiner*—Tuan Q Dam
*Assistant Examiner*—Isaac T Tecklu
(74) *Attorney, Agent, or Firm*—Browdy and Neimark, PLLC

(57) ABSTRACT

The inventive method for determining operational characteristics of a program includes a verification procedure involving the following stages: the first stage for expressing the operational characteristics of the program in the form of functions related to events producible during possible executions of the program, a second stage for simultaneously estimating, by program analysis, the program structure, the possible ways of execution and values used at different program points and the third stage for determining said characteristics by calculating associated functions by means of information extracted with the aid of the analysis.

19 Claims, 1 Drawing Sheet

METHOD FOR DETERMINING OPERATIONAL CHARACTERISTICS OF A PROGRAM

BACKGROUND OF THE INVENTION

1. Field of the Invention

The present invention relates to a method for determining operational characteristics of a program.

It applies notably validation of applications relative to given specific operational criteria and, in particular, to the automation of the control of the program in order to execute it on target platforms by given users.

The invention likewise relates to a system implementing the method according to the invention to guarantee that applications proposed by a server observe validity criteria associated with platforms for executing these applications.

2. Description of the Prior Art

The majority of small onboard systems (payment terminals, electronic organisers, mobile telephones, smart cards, etc.), manufactured some years ago were closed systems capable of executing only determined programs installed at manufacture. Similarly, although functionally more open, the majority of computers were disconnected from any network and the few programs they did execute originated from well-identified software editors.

Due to this slight variability, it was possible to "contain" the operating faults of the execution platforms and programs.

Today, the trend is to open small onboard systems: even if control does not always return directly to the end user, new programs may in the future be loaded onto these execution platforms. Further, many computers and onboard systems are connected, temporarily or not, to networks (Internet, mobile telephony, etc.) on which programs of often unknown origin and often indeterminated functionality are downloaded. Finally, segmentation of markets and the multiplication of suppliers, hardware models and software versions result in combinations of configurations not always anticipated, despite the definition of standards. This situation accentuates the risks of malfunctioning, notably with respect to security and interoperability.

Voluntary or involuntary, the malfunctions of an application primarily concern security. An application may for example execute illicit operations (disclose secret code, connect to unauthorised sites, silently send messages, etc.), execute licit operations but for which it has no appropriate rights, consume more resources than it may be entitled to and thus disqualify other applications, alter precious data, etc.

Another major problem concerns interoperability. In fact, an application may require hardware or software functionalities which prove not to be present on the execution platform (for example because they are optional or limited) or which are present unexpectedly (for example due to version incompatibility). In this case, the application does not run or functions poorly, which the end user may wrongly attribute to the supplier of the service or equipment.

The consequences of these malfunctions may be very serious in the case of critical systems where security is vital. This is the case for example for applications in the banking, health, transport, identity domains, etc. Even when the malfunctions are minor for the users and only end up as slight damage or system outages, the commercial repercussions may be disastrous for the suppliers of hardware or software: not only may this necessitate costly hardware recalls, but it especially may damage their reputation among consumers. The risk is notably evident for telephone operators who allow their users to download new programs to their mobile phones.

Other than the problems of security and interoperability, certain suppliers also want to apply deontology discipline (for example, for the control of access to minors), principles of ergonomics or style rules (for example, complying with a "Look and Feel").

The problem is in fact more generally that of controlling the adequacy of a program for a certain "policy" of security, interoperability, etc.

Before responding to the question of controlling programs, a first step consists of establishing criteria, first of all, which define whether it is acceptable or not that a given program be executed on a given target platform (or a set of platforms) by certain groups of given users. Security criteria may notably originate from a previous risk analysis, which notably evaluates the assets to be protected on the platform and in the programs, the threats to these assets, and the measures to be taken to guard against them. Interoperability criteria may be drawn from error cases signalled by test teams and the users, as well as from good programming experience by developers.

For example, in the case of application to smart cards, a security criterion may stipulate that it is prohibited to use excessively weak "DES" keys, for example of a length of less than 128 bits. Similarly, an interoperability criterion may stipulate not to use "RSA" key, or "RSA" keys longer than 1024 bits, because the target platform does not handle this type of key, or keys of such a size.

To be verified non-ambiguously, the criteria must be clearly formulated. A criterion is often expressed in the form of constraints concerning the usage of routines or classes of libraries. In the case of "Java Card" applications (specialised language for execution on a smart card), the security criterion example hereinabove is expressed more explicitly by: "The buildKey(keyType,keyLength, . . . )" "method is not called with a "keyLength" argument less than 128 if the "keyType" argument is equal to the value of the constant "TYPE DES"".

("Java" and "Java Card" are registered trade marks of Sun Microsystems. For legibility reasons, the prefix of the javacard.framework.KeyBuilder class will deliberately be omitted).

Therefore the following program meets the security criterion:

```
"void install (byte[ ] buf, short ofs, short len) {
...
switch (buf[ofs++]) {
    case 1://Use DES 128 bits
        myKey = buildKey (TYPE_DES, LENGTH_DES3_2KEY);
        break;
    case 2://Use DES 192 bits
        myKey = buildKey (TYPE_DES, LENGTH_DES3_3KEY);
        break;
    case 3://Use RSA 1024 bits
        myKey = buildKey
        (TYPE_RSA_PRIVATE,LENGTH_RSA_1024);
        break;
    }
    ...
}
```

In fact, irrespective of the execution paths, the "buildKey" method is always called with arguments compatible with the criterion: or else "keyType" is "TYPE DES" and "keyLength" is "LENGTH_DES3_2KEY" (equal to 128) or "LENGTH_DES3_3KEY" (equal to 196), or else "keyType" is "TYPE_RSA_PRIVATE" (different to "TYPE DES").

On the other hand, the following program does not meet the criterion.

```
void install (byte[ ] buf, short ofs, short len) {
    ...
    myKey = buildKey(buf[ofs++], buf[ofs++]);
    ...
}
```

In fact, the value "buf" is a dynamic argument: it is therefore possible to construct keys of arbitrary type and length. In particular, it is therefore possible for "buf[ofs]" to be equal to "TYPE_DES" and for "buf[ofs+1]" to be less than 128.

With respect to effective control of a program, the state of the art may be summarised as follows:

Several approaches are employed today to determine whether a given program meets given criteria for a given platform. They are distinguished according to several aspects: control is static (prior to execution on the platform) or dynamic (during execution); control is black box (without examining the code) or "white box" (examining the code); control is "manual" (without the aid of analysis tools) or automatic (with the aid of an analysis tool). Controls currently being used are the following:

The criteria, notably security, may be applied by dynamic controls carried out during execution of the program. This approach has three major disadvantages. First of all, it discovers the problems too late, once the program is already loaded and executing. Next, because it has only one black box vision of the application, it needs to arbitrarily limit exploitation of the functionalities and resources of the platform (for example, not sending any more than three messages). Finally, it does not solve the interoperability problems.

The program may also be tested in black box, without regarding the code. With this approach, the program is executed under a certain number of supposedly representative circumstances, and its performance is observed from the outside to assess whether it observes the criteria. This solution may respond to certain questions related to ergonomics, but does not provide a strong guarantee on the questions of security or interoperability. In fact, with this method only a small number of possible execution paths are examined, even though there is an infinite number of them. For example, Trojan horses (program or data which seem harmless when loaded on the platform but which then facilitate an attack, for example by a pirate or a virus) cannot be detected definitely.

The program may be controlled manually, by examining the code but without the aid of an analysis tool. This solution has numerous disadvantages. Such control is in fact long (therefore costly) and fastidious, in practice prohibiting the processing of large volumes of programs. In addition, it is necessary to repay the cost of the control with each new version of the program, the execution platform or criteria. Furthermore, this approach supposes in practice that the source code of the program is available, which is less often the case for reasons of confidentiality or intellectual property. When only the object code is available, manual analysis becomes extremely long and difficult, and the risk of human error is multiplied accordingly.

The program may also be controlled automatically, with the aid of an analysis tool. Several types of tool exist today:

Certain tools verify by means of static analysis that the code of a program complies with general rules of good formation and good typing, which affords certain guarantees of good operation, irrespective of the target platform. This is for example the case of "bytecode verifiers" associated with Java execution environments, including Java Card. Such analysers of types may operate just as well on the source code as on the object code. However, they do not meet particular criteria, for example relating to security or interoperability.

Other tools, especially intended for developers, verify by means of static analysis that the code of a program cannot conduct operations which have no meaning, such as dereferencing a null pointer or acceding to an array element outside the limits. These tools therefore contribute certain guarantees for proper operation, irrespective of the target platform. But as for type analysers, they do not meet particular criteria.

Finally, certain tools examine the program source or object code, to search for occurrences of routine calls. They therefore apply specific criteria which prohibit the use of certain routines (whether for reasons of security or interoperability): they reject any program which comprises calls to these routines. However, such tools cannot either verify the kind of rule given as an example hereinabove: it is necessary to not only detect that the buildKey method is called but also to know if its first argument is equal to "TYPE_DES" and its second argument is less than 128.

OBJECT OF THE INVENTION

Considering the aforementioned problems, the object of the invention more particularly is to allow the development of control tools which may adapt to the needs of specific rules while allowing automatic verification of complex rules, notably concerning the possible value of the arguments of certain operations and the chaining of such operations.

SUMMARY OF THE INVENTION

For this purpose, it proposes a method for determining operational characteristics of a program using a verification procedure comprising the following steps:

a first step comprising:
  expressing the operational characteristics of the program as functions dealing with occurrences or sequences of occurrences of events which may be produced throughout possible executions of the program, said events being able to deal with particular operations, particular values, at particular points of the program and in particular states of the program;
  determining a possible level of precision with which these characteristics must be determined;
  determining a possible set of particular contexts of execution in which the program will always be executed;
  determining possible operational specificities of a set of platforms on which the program will be executed;

a second step of estimation, by program analysis, and by considering said possible level of precision, of said possible set of particular execution contexts and of said possible operational specificities of platforms, of information relating to the structure of the program, the possible execution paths of the program and possible data values, at various points of the execution paths and under different execution conditions, of the states and data handled by the program;

a third step for determining said operational characteristics, by means the information extracted by said program analysis, by calculating of said functions on the occurrences or particular sequences of occurrences of particular operations, dealing with particular values, at particular points of the program, in particular states of the program, for the set of execution paths determined by analysis.

This method may take into account:

a set of characteristics relating to the operations which the program may carry out during its execution.

Advantageously, the information extracted during the second step of the method may be represented by means of one or more of the following structures: state graph of the program, inheritance graph, program routine calls graph, control flow graph of each program routine, structure of loops and catch-up of exceptions, structure of basic blocks, abstraction of the state of the program at a point of execution, it being understood that:

said extraction of information does not deal with unnecessary information for determining operational characteristics, both from the viewpoint of the amount of information extracted and the precision of this information, the major pieces of information among said extracted information are computed and stored, while the other pieces of information are only computed when necessary for the determination of said operational characteristics.

By "a major piece of information" is meant the information extracted at the nodes of a breaking down of the code of the routines in a graph of basic blocks, the other pieces of information (in the body of the basic blocks) being recomputed by local analysis from information stored at the start and end of the corresponding block.

It seems clear that this method may be implemented to achieve a system for executing multiple applications ensuring that the applications observe given validity criteria.

The invention also applies to automatic filtering of a set of programs relative to a set of given validity criteria. In this case, the above operational characteristics represent validity criteria. The determination step thus ascertains either that the program is valid because it observes each of said criteria, or is invalid because at least one of said criteria cannot be observed.

DESCRIPTION OF THE PREFERRED EMBODIMENTS

Figure 1:
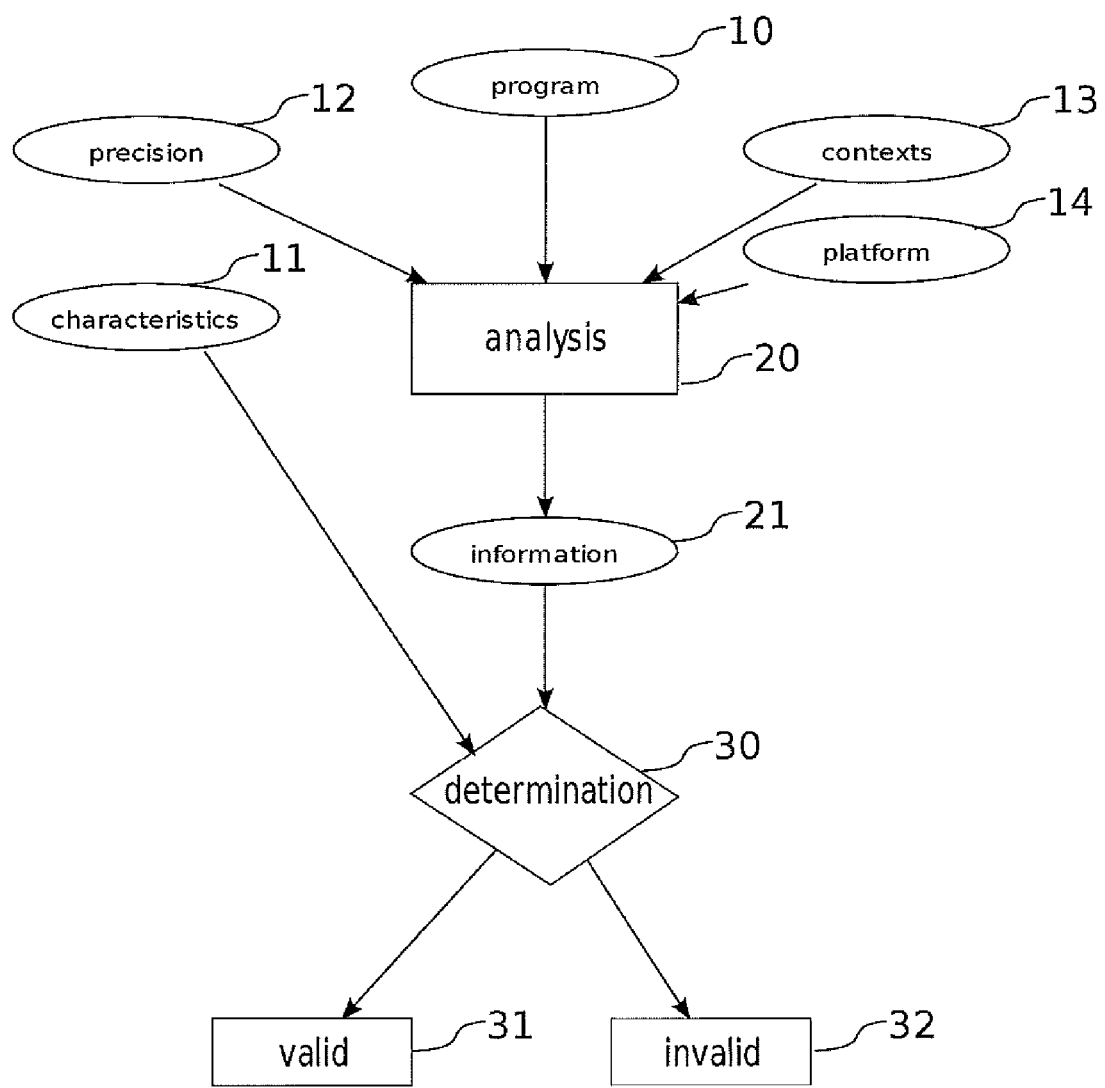
FIG. 1 illustrates the method according to one embodiment of the invention.

The present invention, illustrated in FIG. 1, relates to a method for determining operational characteristics of a program 10 using a verification procedure comprising the following steps:

a first step comprising:
expressing the operational characteristics 11 of the program as functions dealing with occurrences or sequences of occurrences of events which may be produced throughout possible executions of the program, said events being able to deal with particular operations, particular values, at particular points of the program and in particular states of the program;

determining a possible level of precision 12 with which these characteristics must be determined;

determining a possible set of particular contexts of execution 13 in which the program will always be executed;

determining possible operational specificities of a set of platforms 14 on which the program will be executed;

a second step of estimation, by program analysis 20, and by considering said possible level of precision 12, of said possible set of particular execution contexts 13 and of said possible operational specificities of platforms 14, of information 21 relating to the structure of the program, the possible execution paths of the program and possible data values, at various points of the execution paths and under different execution conditions, of the states and data handled by the program;

a third step for determining 30 said operational characteristics 11, by means the information 21 extracted by said program analysis, by calculating of said functions on the occurrences or particular sequences of occurrences of particular operations, dealing with particular values, at particular points of the program, in particular states of the program, for the set of execution paths determined by analysis.

This method may take into account:

a set of characteristics relating to the operations which the program may carry out during its execution.

Advantageously, the information extracted during the second step of the method may be represented by means of one or more of the following structures: state graph of the program, inheritance graph, program routine calls graph, control flow graph of each program routine, structure of loops and catch-up of exceptions, structure of basic blocks, abstraction of the state of the program at a point of execution, it being understood that:

said extraction of information does not deal with unnecessary information for determining operational characteristics, both from the viewpoint of the amount of information extracted and the precision of this information, the major pieces of information among said extracted information are computed and stored, while the other pieces of information are only computed when necessary for the determination of said operational characteristics.

By "a major piece of information" is meant the information extracted at the nodes of a breaking down of the code of the routines in a graph of basic blocks, the other pieces of information (in the body of the basic blocks) being recomputed by local analysis from information stored at the start and end of the corresponding block.

It seems clear that this method may be implemented to achieve a system for executing multiple applications ensuring that the applications observe given validity criteria.

The invention also applies to automatic filtering of a set of programs relative to a set of given validity criteria. In this case, the above operational characteristics represent validity criteria. The determination step thus ascertains either that the program is valid 31 because it observes each of said criteria, or is invalid 32 because at least one of said criteria cannot be observed.

The three steps of the verification procedure implemented by the method according to the invention will be described in greater detail herein below, as a non-limiting example.

Expression of the Criteria:

In a first phase, the criteria are translated into terms of events defined as the achievement of particular operations dealing with particular values at particular program points. By way of example, certain of said particular operations (which form events, accompanied by constraints on the values manipulated, by execution points, and the states of the program) are defined as one of the following actions: call to a given routine, access to a given variable, reading or writing on a given port, computing a given arithmetic expression, completing execution of the program or routine (on a normal return or exception ending).

An event is for example the call to a routine with an argument within a certain interval (cf. example hereinabove relating to the call to the "buildKey" method with an argument less than 128), the access to an array element at a certain index, the fact that the addition arguments are such that the addition may overflow, the attainability of a program point under a symbolic condition dealing with the values handled by the program, the fact that the program or a routine terminates in a particular state by ending a particular exception, etc.

A criterion is even expressed as a function dealing with the occurrences or particular sequences of occurrences of such events, during diverse possible executions of the program. Relatively complex criteria may thereby be modelled.

A possible framework for the formal expression of such criteria is linear temporal logic (LTL). This formalism may for example express that events always occur, or else sooner or later, that a condition remains true until an event occurs, etc.

For example, "Java Card" provides a specific aid for creating a transaction (atomic update of the permanent state of the system). For this, it is necessary to call the "beginTransaction( )" method, conduct updates, then call the "commitTransaction( )" method. This then guarantees that in the event of refreshing (notably untimely) the card, either no change will be made, or all changes will not have been made. The validity criterion for transactions stipulates notably that the "commitTransaction( )" method must be called only after the "beginTransaction( )" call.

The sequences of events may also involve the values handled by the program. For example, if a criterion stipulates that a resource cannot be released without it previously having been allocated, or else the release would fail, an explicit rule of the following type may be defined: a given routine (e.g. for releasing a resource) may be called with a certain argument only if this argument was the return value of another given routine (e.g. for allocating a resource) called previously. Such an example in the "Java Card" implementation of the "Open Platform v2.0.1" specification is given by the method for closing a secured channel ("closeSecureChannel"), which must be called with the return value of the method for opening the secured channel ("openSecureChannel") as argument. The following program is invalid in this sense:

```
void process (APDU apdu){
...
chanNum = openSecureChannel (apdu);
...
closeSecureChannel (0);
...
}
```

In fact, for this program to be valid, the closing of the secured channel by "closeSecureChannel (chanNum)" would be required. This program accordingly works only in the case where the method "openSecureChannel" returns the value 0.

The intention may also for example be to ensure that specific processing must necessarily be provided for a set of particular circumstances. An associated criterion may for example be expressed by the following rule: for any given value of an argument of a given routine (e.g. recording the application to interruptions or programmatic events designated by this argument), there is code of another given routine (e.g. processing of interruptions or programmatic events to which the application is subscribed) which is attainable only when this other routine is called with said value as argument.

The translation of the criteria in terms of thereby formulated explicit rules may be completed once for all, as long as the criteria remain the same. Except in the case of particular criteria dependent on a given specification or a given program implementation, the translation is in fact independent of the programs.

Extraction of Information by Program Analysis:

In a second phase, for a given program, static analysis extract information relating to the structure of the program, the possible execution paths of the program and the possible values, under different execution conditions, of the data handled at various points of the execution paths.

There is a set of known techniques for determining information on the possible execution paths of the program. With these techniques, the call graph of the routines of the program and, for each routine, its control flow chart (whereof the nodes are either grouped or not in basic blocks) and its structure of loops and catch-up of exceptions may notably be computed. These miscellaneous data structures are finite and regular expressions which may in fact represent an infinite number of execution paths and form a superset (for reasons of approximation explained hereinbelow) of the set of all the possible execution paths of the program.

There are likewise techniques, notably abstract interpretation, with which approximate values (for example, sets of possible values) of data handled by the program at various points of execution of the code, may be produced. This type of information is ordinarily computed so as to detect elementary operations which risk failing, such as dereferencing of a null pointer or access to an array element beyond its limits But abstract interpretation is more general. It may notably handle symbolic values and thus determine the abstract conditions associated with the diverse execution paths which the program may take. With this, for example, as in the example of the specific processing hereinabove, it is possible to know whether a program point is attainable solely under a particular, given or computed condition.

Other architectural elements of the program, as the inheritance graph (expressing the hierarchy of classes in the case of object languages), may also be determined.

Determination of the Observance of the Criteria:

In a third and final phase, the criteria are evaluated on the information extracted by analysis. In other words, the functions associated with the criteria are evaluated by considering, for the set of computed possible execution paths, the particular occurrences or sequences of events formed by the achievement of particular operations at particular program points and dealing with particular values. The effective nature of the computations depends on the formulation of the criteria and the types of information extracted by analysis.

Numerous improvements of the invention may be constructed on the basis of the procedure described hereinabove. Examples of such improvements, combinable with one another, will be described individually hereinbelow.

Parameterisation of the Precision:

First of all, it will be observed that, in general, the execution paths and the values handled by the program correspond to so-called undecidable mathematical properties: this cannot be determined with exactitude but it may nevertheless be approximated. In practice, this means that the paths and values handled may be known only with limited precision.

Now, it is often vital that this information should be determined with considerable precision. In the opposite case, it may be pointed out that a criterion (for example which imposes that a amount is positive) risks not being observed (for example because it was only possible to determine that this amount might be between −10 and 30), whereas better analysis precision (for example which would determine that this amount may in fact be only between 5 and 20) would have concluded that the criterion is always observed.

In the absence of sufficient precision, it is either necessary to reject the application 'for security' (at the risk of rejecting a harmless application), or manually control the criteria from which automatic analysis was unable to draw a conclusion. In the case of manual analysis, it is possible to benefit from information extracted by analysis which, even though not sufficiently precise, often circumscribes the perimeter of verification.

In all cases, it is advantageous to allow parameterisation of the precision with which said analysis are conducted. This parameterising may concern the domains of abstract values. For example, the whole values may be abstracted by exact values (or the undetermined value) or by intervals. Similarly, the references may be abstracted by type; the tables, by indicating their length; the character strings, by indicating the known prefix (optionally empty) of the string, etc. The parameterising may also concern the value merging points during abstract interpretation: analysis either sensitive to the program point or not, mono-procedural or inter-procedural analysis, context-sensitive analysis or not, etc.

Execution of the Program in Particular Contexts:

Furthermore, irrespective of the precision of the analysis, the approximate values of the data handled are properties of the program which are true for all possible executions of the program, that is, irrespective of its entry arguments. But there are cases where it is known that if the program will only be used in a certain way, in certain contexts, i.e. with known constraints relating to its arguments.

Under this circumstance, the precision of analysis may be improved by taking into consideration hypotheses on the values of these arguments. In the case of analysis by abstract interpretation, instead of supposing all arguments to be undetermined, particular abstract values may notably be given to the parameters (including configuration parameters) and to the arguments of the program prior to starting the analysis.

Computations Reduced to the Necessary Information:

In addition to the precision of the computed information, the amount of this information is also a parameter to be played on. In particular, it is not necessary for program analysis to determine all the values handled at all program points. In fact, only the information intervening in the formulae which represent the criteria has to be computed and saved during analysis.

To further reduce the amount of saved information, information may also be saved only at certain critical points and the missing information may be recomputed according to the needs for evaluating the criteria. For example, information may be saved only at the breakdown nodes of the code of the routines in a graph of basic blocks; when a piece of information is required at any program point of a basic block, it may easily be recomputed by simple local analysis from information saved at the start and end of the block.

These optimisations reduce the resources (memory space, computation time) required for implementing the verification procedure. With constant resources, these optimisations also allow better precision, and therefore a reduction or removal of possible additional manual verifications.

Simultaneous Calculations of Information and Evaluation of Criteria:

In the same spirit of reduction of resources consumed, certain criteria may also be evaluated on the fly, during program analysis. By combining at least for certain criteria the second and third steps of the verification procedure, massive even temporary information storage is avoided, the information is consumed as soon as it is produced, and then may be forgotten.

Verification of Interactive Programs:

Furthermore, the procedure described hereinabove may be applied to an interactive program, that is, to a program which depends on an undetermined number of external dynamic values resulting from this interaction. Such a program may in fact be seen as a program which progressively reads optionally infinite series of data, (the execution contexts are given here by an abstract description of the possible series of data representing said dynamic values). These series of data may be modelled by abstract finite values in the same way as the other arguments of the program, for static analysis needs.

Verification of Programs in Frameworks of Execution:

Also, in certain cases, part of the logic of the program may be managed by a framework of execution, implemented on the platforms. For example, "Java Card" applications are inscribed in such a framework. A "Java Card" application must notably inherit the "javacard.framework.Applet" class and define two methods: "install( )" and "process( )". The execution of the program consists of the call by the platform of the "install( )" method with an array of bytes as argument, then (by omitting to simplify the question of selection) and then of an undetermined number of calls of the "process( )" method with, at each call, a novel array of bytes as argument. (It is noted that "Java" Card applications are therefore likewise interactive programs in the sense indicated hereinabove).

To apply the procedure described hereinabove to such programs, it is also necessary to take into account the framework of execution. In the example of "Java Card", this may result in making the loop explicit for analysis, the loop which is implicit in the framework of execution, which makes the calls to the "process( )" method.

Statistical analysis may consider the semantics of this framework of execution (including the possible implicit interaction loops of the program).

State Graph:

To increase the precision of analysis, it is also sometimes necessary to "unwind" the loops and recursive calls of the program as a function of information relating to the values handled by the program on execution. Therefore the result is not global information which is true irrespective of the number of iterations of a loop or recursive calls, but local information, for each loop winding or recursive call. This case notably occurs in the event of interactive programs which are inserted into frameworks of execution. For example, in the case of a "Java Card" application, the successive calls to the "process( )" method may lead to different analysis results as a function of the computed states of the program during previous calls.

Analysis of the application, after unwinding of the implicit interaction loop as well as abstraction and identification of the states of the program, thus provides as a result a state graph on which the criteria may be computed. The nodes of this state graph represent the states of the application; the transitions of this graph are labelled by the different classes of arguments provided to the "process( )" method.

Operating Specificities of the Execution Platforms:

Furthermore, as indicated in the introduction, proper operation of a program depends on the execution platform, which may implement certain functionalities or not, conveniently or not.

In order to correctly or more finely provide the performance of a program on a platform or a given set of platforms, the operating specificities of these platforms (for example the performance of the libraries) may be provided and exploited at the time of program analysis. Of course, evaluation of the criteria as a function of information extracted from such analysis is specific to the corresponding target platforms.

In the case of analysis by abstract interpretation, the operating specificities may be given by abstract functions defining the semantics of the particular operations of these platforms.

Generalisation of Operational Characteristics of the Programs:

It is important also to note that the procedure described hereinabove is not limited to Boolean criteria and covers a wider spectrum than that of the validation of applications. More generally, this procedure in fact determines operational characteristics of a program.

For example, the method according to the invention, because of its three steps, determines the resources consumed by the program during its execution, such as for example the total amount of allocated memory. Combining the information for accessing resources, collected along the various possible execution paths, in fact provides a framing of the resources consumed.

This procedure also notably determines the functionalities of the execution platform exploited by the program during its execution. The utilised functionalities which are inventoried along each of the possible execution paths may be combined.

Validation of Novel Criteria:

It may likewise be observed that the procedure described hereinabove analysis a unique given program relative to given criteria, criteria optionally specific to a single platform or given class of execution platforms.

All the same, it is not strictly necessary to re-analyse a program when the question of its adequacy to novel criteria or a novel execution platform arises. It is in fact enough to re-exploit the information previously extracted, and saved in a database for example.

Validation and Filtering of a Set of Programs:

Combining the characteristics extracted from a program set also creates a validation procedure of a group of programs intended for residing together on a given platform. Otherwise expressed, groups of programs which form a coherent whole relative to given criteria may be composed.

This functionality may be utilised as a filter on an applications server. Knowing the characteristics of the execution platform of a user of this service, the applications incompatible with this platform are masked. The user therefore has access only to those applications compatible with its execution platform. He/she is therefore guaranteed of proper functioning of any application he/she would want to load. It should be noted that it is not necessary to redo the program analysis in order to propose a list of valid applications to a user: the analysis results are reused; only the computations corresponding to the compatibility test relative to the execution platform are to be redone, if they have not already been computed.

Preferably, the extraction of information by static program analysis is only done once per program and reused each time it is necessary to determine if the program observes a set of given validity criteria.

Abstraction of Extracted Information:

In practice, the results of static program analysis may be sufficiently voluminous and therefore difficult to store. When this is the case, it may be advantageous to abstract these results so as to retain only simplified information.

This may notably be limited to an execution profile, defined for example as the set of functionalities exploited by the program and the maximum amount of resources consumed during any execution. Such a profile, which does not particularly show the notion of execution paths, requires much less memory space. It is easily compared to a set of known functionalities as available on the platform for interoperability questions, a set of functionalities declared usable according to security criteria, and a limit relating to the consumption of resources.

With this use of the method, the "diagnostics" of an application may be worked out, for a class of criteria and particular execution platforms.

Onboard Validation:

The determination of operational characteristics may be done, all or in part, on the same platform which executes the program. This case is particularly interesting in the case when the operational characteristics are validity rules which express observance by a program of particular criteria and when the execution platform is an onboard system, such as for example a mobile phone or a smart card.

Two particular cases are to be noted. In the first case, at the same time the extraction of information and the evaluation of validity rules are carried out on the program execution platform. In the second case, the extraction of information by program analysis is done outside the platform; it is then transmitted to the platform, for example when the program is being loaded; finally, evaluation of validity rules by means of transmitted information is performed on this same platform.

As previously mentioned, the invention likewise concerns a system implementing the method previously described to ensure that applications proposed by a server to clients observes validity criteria associated with the execution platforms of these applications.

This system may advantageously comprise filtering means designed such that, for any client wishing to accede to the applications for a certain execution platform, the applications are filtered according to the previously described verification procedure and only the applications which observe the validity criteria for said platform are presented to the client.

Similarly, the invention concerns a multi-application execution system ensuring that the applications observe given validity criteria, this system using an application analysis server, a server for validation of applications and a multi-application platform.

This system also uses means for ensuring, prior to the loading or execution of an application on the platform:
    observance by this application of said criteria according to the previously described method, the extraction of information being carried out on the application analysis server while the evaluation of said criteria is carried out on the server for validation of applications, and in the case when one of the criteria cannot be observed, the failure of loading or executing the application, changing the state of the system and emitting a sound or visual signal to alert of the failure of loading or execution.

In this system, the server for validation of applications may execute on the multi-application platform, with the application analysis server executing outside the platform. Optionally, the application analysis server and the server for validation of applications may execute on the multi-application platform.

The invention claimed is:

1. A method for determining the operational characteristics of a program, comprising a verification procedure comprising the following steps:
    a first step comprising:
        expressing the operational characteristics of the program as functions dealing with occurrences or sequences of occurrences of events occurring during executions of the program, said events being able to deal with particular operations, particular values of data, at particular program points and in particular states of the program;
        determining a level of precision with which these characteristics must be determined;
        determining a set of particular contexts of execution in which the program will always be executed; and
        determining operational specificities of a set of platforms on which the program will be executed;
    a second step of estimation, by program analysis, and in consideration of said level of precision, of said set of particular contexts of execution and of said operational specificities of platforms, of information relating to a structure of the program, execution paths of the program and to values of data, at various points of the execution paths and under different execution conditions, of states of the program and data handled by the program; and
    a third step for determining said operational characteristics, by means of the information extracted by said program analysis, by computation of said functions on the occurrences or particular sequences of occurrences of particular operations, dealing with particular values, at particular points of the program, in particular states of the program, for the set of execution paths determined by analysis.

2. The method according to claim 1, wherein, in the case when the program is interactive and may depend on an undetermined number of dynamic values resulting from this interaction, the contexts of execution are given by a description abstracted from series of data representing said dynamic values.

3. The method according to claim 1, wherein, in the case where the program is inserted into a framework of execution, said second step of estimation comprises static analysis which also take into account the semantics of this framework of execution, including implicit interaction loops of the program.

4. The method according to claim 1, wherein certain of said particular operations, which form events, accompanied by constraints on the values handled, the execution points, and the states of the program, are defined as one of the following actions: call to a given routine, access to a given variable, reading or writing on a given port, computation of a given arithmetic expression, completion of execution of the program or of a routine on a normal return or ending an exception.

5. The method according to claim 3, wherein certain of said static analysis consist of abstract interpretations of the program, on abstract domains which may notably represent sets of values and symbolic expressions.

6. The method as claimed in claim 1, wherein said extracted information are represented by means of one or more of the following structures: state graph of the program, inheritance graph, graph of the routine calls of the program, control flow chart of each routine of the program, structure of loops and catch-up of exceptions, structure of basic blocks, abstraction of the state of the program at an execution point.

7. The method according to claim 1, wherein said extraction of information does not apply to unnecessary information for determining the operational characteristics, both from the viewpoint of the amount of information extracted and from the precision of these pieces of information.

8. The method according to claim 1, wherein only major pieces of information among said extracted information are computed and saved and in that the other pieces of information are only computed when necessary for determining said operational characteristics.

9. The method according to claim 8, wherein the major pieces of information are information extracted at breakdown nodes of the code of routines in a graph of basic blocks and in that the other pieces of information, in the body of the basic blocks, are recomputed by local analysis from information saved at the start and end of the corresponding block.

10. The method according to claim 1, wherein said operational characteristics represent validity criteria and in that said determination establishes that the program is valid, because it observes each of said criteria, or invalid, because at least one of said criteria cannot be observed.

11. The method according to claim 10, wherein said validity criteria express security or interoperability rules.

12. The method according to claim 1, wherein said operational characteristics characterise resources which are consumed and functionalities which are exploited by the program during its execution and in that said determination provides an execution profile of the program.

13. The method according to claim 3, wherein a computation of certain of said functions associated with the operational characteristics is performed during said static program analysis, as soon as certain of said pieces of information are extracted.

14. The method according to claim 10 for automatic filtering of a set of programs relative to a given set of validity criteria, wherein the extraction of information by static program analysis is only completed once per program and reused whenever necessary for determining whether the program observes said set of validity criteria.

15. A method for distribution of applications ensuring that the applications observe validity criteria associated with the execution platforms of these applications, comprising filtering step such that, for any client desiring to accede to the applications for a certain execution platform, the applications are filtered by a verification procedure in accordance with the method according to any one of claims 1 to 12, only the applications which observe the validity criteria for said platform being presented to the client.

16. A system for multi-application execution of the method for determining the operational characteristics of a program of claim 1, for ensuring that the applications observe given validity criteria, the system comprising:
    an application analysis server, a server for validation of applications and a multi-application platform, and
    means for ensuring, prior to loading or execution of an application on the platform:
        observance by this application of said validity criteria, an extraction of information being carried out on the application analysis server and an evaluation of said validity criteria being carried out on the server for validation of applications, and in the case when one of the validity criteria cannot be observed, a failure of loading or execution of the application, a change of the state of the system and an emission of a sound or visual signal to alert of failure of loading or execution.

17. A system for multi-application execution of the method for determining the operational characteristics of a program of claim 1, for ensuring that the applications observe given validity criteria, the system comprising:

an application analysis server, a server for validation of applications and a multi-application platform, and means for ensuring, prior to loading or execution of an application on the platform:

observance by this application of said validity criteria, an extraction of information being carried out on the application analysis server and an evaluation of said validity criteria being carried out on the server for validation of applications, and in the case when one of the validity criteria cannot be observed, a failure of loading or execution of the application, a change of the state of the system and an emission of a sound or visual signal to alert of failure of loading or execution, the means for insuring observance by said application of said validity criteria executing a procedure comprising the following steps:

a first step comprising:

expressing the validity criteria of the program as functions dealing with occurrences or sequences of occurrences of events which occurring during executions of the program, said events being able to deal with particular operations, particular values of data, at particular program points and in particular states of the program;

determining a level of precision with which these validity criteria must be determined;

determining a set of particular contexts of execution in which the program will always be executed;

determining operational specificities of a set of platforms on which the program will be executed;

a second step of estimation, by program analysis, and in consideration of said level of precision, of said set of particular contexts of execution and of said operational specificities of platforms, of information relating to a structure of the program, execution paths of the program and to the values of data, at various points of the execution paths and under different execution conditions, of the states of the program and data handled by the program;

a third step for determining said validity criteria, by means of the information extracted by said program analysis, by computation of said functions on the occurrences or particular sequences of occurrences of particular operations, dealing with particular values, at particular points of the program, in particular states of the program, for the set of execution paths determined by analysis.

18. The system according to claim 17, wherein the server for validation of applications is executed on the multi-application platform, the application analysis server executing outside the platform.

19. The system according to claim 17, wherein the application analysis server and the server for validation of applications are executed on the multi-application platform.

* * * * *